United States Patent
Masuda

(10) Patent No.: US 9,448,080 B2
(45) Date of Patent: Sep. 20, 2016

(54) NAVIGATION SYSTEM, INFORMATION PROVIDING METHOD, AND MOBILE COMMUNICATION TERMINAL

(71) Applicant: HONDA MOTOR CO., LTD., Tokyo (JP)

(72) Inventor: Takuro Masuda, Fujimino (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 14/769,930

(22) PCT Filed: Jan. 9, 2014

(86) PCT No.: PCT/JP2014/050251
§ 371 (c)(1),
(2) Date: Aug. 24, 2015

(87) PCT Pub. No.: WO2014/132677
PCT Pub. Date: Sep. 4, 2014

(65) Prior Publication Data
US 2016/0003632 A1 Jan. 7, 2016

(30) Foreign Application Priority Data

Feb. 28, 2013 (JP) .................................. 2013-038863

(51) Int. Cl.
*G01C 21/34* (2006.01)
*G08G 1/0967* (2006.01)
(Continued)

(52) U.S. Cl.
CPC ......... *G01C 21/34* (2013.01); *G08G 1/096716* (2013.01); *G08G 1/096741* (2013.01);
(Continued)

(58) Field of Classification Search
CPC ........... G01C 21/34; G08G 1/096716; G08G 1/096741; G08G 1/096775; H04N 21/41422; H04N 21/422; H04N 21/4524; H04W 4/06
USPC ........................................................ 701/522
See application file for complete search history.

(56) References Cited

U.S. PATENT DOCUMENTS 6,615,381 B1 9/2003 Fukuda et al.
2010/0169010 A1* 7/2010 Jeong ................. G01C 21/3647
701/533

(Continued)

FOREIGN PATENT DOCUMENTS

JP 11-355854 A 12/1999
JP 2007-060489 A 3/2007

(Continued)

OTHER PUBLICATIONS

International Search Report and Written Opinion dated Feb. 10, 2014 corresponding to International Patent Application No. PCT/JP2014/050251, and English translation thereof.

(Continued)

*Primary Examiner* — McDieunel Marc
*Assistant Examiner* — James E Stroud
(74) *Attorney, Agent, or Firm* — Squire Patton Boggs (US) LLP

(57) ABSTRACT

Provided are a navigation system, an information providing method and a mobile communication terminal wherein the merits of wide-area information delivery using broadcast waves are sufficiently utilized and further delivery data are selected or discarded at each of a plurality of terminals according to the position or traveling path thereof, whereby information in accordance with the position of each mobile communication terminal can be provided. A broadcast station of a navigation system digital-broadcasts, to a plurality of mobile communication terminals, a plurality of data files including a plurality of types of content files and at least one guide file. Each mobile communication terminal uses associated information of the guide file to determine and use a content file corresponding to the current position or to a guide path that leads to the destination.

4 Claims, 11 Drawing Sheets

(51) Int. Cl.
   *H04N 21/414*   (2011.01)
   *H04N 21/422*   (2011.01)
   *H04N 21/45*    (2011.01)
   *H04W 4/06*     (2009.01)

(52) U.S. Cl.
   CPC .. *G08G1/096775* (2013.01); *H04N 21/41422* (2013.01); *H04N 21/422* (2013.01); *H04N 21/4524* (2013.01); *H04W 4/06* (2013.01)

(56) References Cited

U.S. PATENT DOCUMENTS

| | | | | |
|---|---|---|---|---|
| 2012/0019674 A1* | 1/2012 | Ohnishi | ................ | G08C 17/00 |
| | | | | 348/207.1 |
| 2013/0247117 A1* | 9/2013 | Yamada | ................ | G08C 17/02 |
| | | | | 725/93 |
| 2016/0048287 A1* | 2/2016 | Lee | ................ | H04N 5/23293 |
| | | | | 715/767 |
| 2016/0080542 A1* | 3/2016 | Park | ................ | H04M 1/72522 |
| | | | | 455/566 |
| 2016/0116299 A1* | 4/2016 | Kim | ................ | G01C 21/3667 |
| | | | | 701/438 |

FOREIGN PATENT DOCUMENTS

| | | | |
|---|---|---|---|
| JP | 2008-089582 | A | 4/2008 |
| JP | 2009-267963 | A | 11/2009 |
| JP | 2010-074360 | A | 4/2010 |
| JP | 2010-141878 | A | 6/2010 |
| JP | 2011-211560 | A | 10/2011 |

OTHER PUBLICATIONS

Rejection of the Application dated Apr. 7, 2015 corresponding to Japanese Patent Application No. 2013-038863 and English translation thereof.

\* cited by examiner

FIG. 5

| PRIORITY LEVEL P | 00: LEVEL 1 (HIGHEST PRIORITY) | 01: LEVEL 2 (HIGH PRIORITY) | 02: LEVEL 3 (LOW PRIORITY) |
|---|---|---|---|
| CONTENTS INFORMATION | EARTHQUAKE INFORMATION<br><br>TSUNAMI INFORMATION<br><br>DISASTER LOCATION INFORMATION<br><br>TRAFFIC REGULATION INFORMATION (LEVEL 1)<br><br>TRAFFIC RESULTS INFORMATION (LEVEL 1)<br><br>EMERGENCY INFORMATION | WEATHER INFORMATION<br><br>HEAVY RAIN/ FLOOD INFORMATION<br><br>ROAD SURFACE FREEZING INFORMATION<br><br>TYPHOON INFORMATION<br><br>TRAFFIC REGULATION INFORMATION (LEVEL 2)<br><br>TRAFFIC RESULTS INFORMATION (LEVEL 2) | WEATHER INFORMATION (SUNNY, CLOUDY, RAINY)<br><br>TRAFFIC REGULATION INFORMATION (LEVEL 3)<br><br>TRAFFIC RESULTS INFORMATION (LEVEL 3) |

FIG. 6

| IDENTIFIER IDbrd \ CATEGORY | EARTHQUAKE | TSUNAMI | TRAFFIC RESULTS | REGULATION INFORMATION | |
|---|---|---|---|---|---|
| 513304 | Area_A-Earthquake.bin | Area_X-Tsunami.bin | 513304-Traffic.bin | 513304-Regulation.bin | |
| 513305 | Area_A-Earthquake.bin | Area_X-Tsunami.bin | 513305-Traffic.bin | 513305-Regulation.bin | |
| ...... | ...... | ...... | ...... | ...... | |
| 513423 | Area_C-Earthquake.bin | Area_C-Tsunami.bin | 513423-Traffic.bin | 513423-Regulation.bin | Flist |
| | Fcnt | Fcnt | | | |

FIG. 11

| CATEGORY | FILE NAME | IDENTIFIER OF BROADCAST TARGET AREA | | | |
|---|---|---|---|---|---|
| TSUNAMI, | Area_A-Tsunami.bin, | 523926, | 523936, | 523946, | ... 534030, |
| TYPHOON, | Year_2012-Typhoon_No10.bin, | 523857, | 523950, | 523951, | ... 554026, |
| REGULATION INFORMATION, | 523857-Regulation.bin, | 523857, | | | |
| REGULATION INFORMATION, | 523950-Regulation.bin, | 523950, | | | |
| ... | | | | | |
| REGULATION INFORMATION, | 554026-Regulation.bin, | 554026, | | | |
| TRAFFIC RESULTS, | 523857-Traffic.bin, | 523857, | | | |
| TRAFFIC RESULTS, | 523950-Traffic.bin, | 523950, | | | |
| ... | | | | | |
| TRAFFIC RESULTS, | 554026-Traffic.bin, | 554026, | | | |

NAVIGATION SYSTEM, INFORMATION PROVIDING METHOD, AND MOBILE COMMUNICATION TERMINAL

TECHNICAL FIELD

The present invention relates to a navigation system and an information providing method for delivering various information by way of broadcasting with respect to a mobile communications terminal that is capable of detecting a current position, as well as to a mobile communications terminal in which the navigation system or the information providing method can be used.

BACKGROUND ART

In Japanese Laid-Open Patent Publication No. 2007-060489 (hereinafter referred to as "JP2007-060489A"), a vehicle-mounted receiver apparatus 100 including a navigation device 102 is disclosed. With the vehicle-mounted receiver apparatus 100, route guidance is carried out using the navigation device 102, and emergency information (disaster information, etc.) contained in a digital broadcast is displayed on a monitor 103 through the navigation device 102.

According to JP2007-060489A, upon determining the emergency information contained within the digital broadcast, at first, it is judged whether or not the value of an emergency alert broadcast flag (emergency information flag) in the received data is 1. If the value of the emergency information flag is 1, then data that is tagged with the emergency information is extracted and used. Stated otherwise, with JP2007-060489A, the contents of the delivered data per se are confirmed to determine whether or not the data should be used as the emergency information.

Further, in a third embodiment of JP2007-060489A, a configuration is disclosed in which, using position information of the vehicle and position information of a disaster occurrence point while route guidance is being performed (i.e., while using route information), the navigation device 102 determines a priority at which the warning information is displayed. Moreover, as a modification of the third embodiment, for example, concerning emergency information of the occurrence of an artificial or unnatural disaster such as a terrorism event or the like, it is described that a broadcast station may be allowed to determine the display priority.

SUMMARY OF THE INVENTION

As discussed above, according to JP2007-060489A, it is disclosed that, using position information itself, which is detected by a GPS of the vehicle, and position information of a disaster occurrence point which is received by a digital broadcast, the navigation device 102 determines a priority at which the warning information is displayed. However, with the configuration disclosed in JP2007-060489A, portions of data of the same format, which are delivered over a wide area, are merely selected and displayed at a priority order that is set by the distance to the disaster location.

Further, although the emergency information and the like are intended to be updated to new information within as short a period of time as possible, with the configuration disclosed in JP2007-060489A, the load on the server for the purpose of correcting data over a wide area is large, and there is a problem in that, in order to shorten the updating period for such data, an extremely large load is imposed on the server side to update the broadcast data.

The present invention has been devised with the aim of solving the aforementioned problems, and has the object of providing a navigation system, an information providing method, and a mobile communications terminal, which are capable of providing information in accordance with positional situations of respective mobile communications terminals, by taking advantage of information that is distributed over a wide area by broadcast waves, along with selecting the distribution data corresponding to a movement path or a position itself on the side of the respective mobile communications terminals.

In a navigation system according to the present invention, two-way communications are performed between a server and a plurality of mobile communications terminals that detect current positions, the server searches for guidance routes to destination points set by the mobile communications terminals and notifies the corresponding mobile communications terminals, and the mobile communications terminals perform route guidance based on the notified guidance routes. The navigation system further comprises a digital broadcast station that digitally broadcasts to the plurality of mobile communications terminals plural data files, each of which includes multiple types of contents files and at least one guidance file. Each of the multiple types of contents files contains contents information that is output to or displayed on the plurality of mobile communications terminals, and an identifier of the multiple types of contents files. The guidance file contains association information, which is information that associates the identifier of the multiple types of contents files with an identifier of a broadcast target area. Each of the plurality of mobile communications terminals is configured to comprise a digital broadcast receiver, which receives the guidance file and the multiple types of contents files. Using the association information, each of the plurality of mobile communications terminals is configured to specify the contents file, which is associated with the identifier of the broadcast target area that matches an identifier of a present region including the current position that is detected by the respective mobile communications terminals and is contained within the guidance file, or matches an identifier of a mobile plan region including the guidance route notified from the server, extract the specified contents file from the digital broadcast, and display or output the contents information included in the extracted contents file.

According to the present invention, with the plurality of mobile communications terminals, based on the guidance file that is included in the digital broadcast, a contents file to be extracted can be specified. Therefore, in each of the mobile communications terminals, contents information corresponding to the current position or the guidance route can be obtained, and displayed or output easily and without excess or deficiency.

Further, with the respective mobile communications terminals, in addition to referring to the guidance file, the contents file to be extracted can be specified by monitoring identifiers of the contents files. Therefore, it becomes unnecessary to confirm the content of the contents information within the contents files, and each of the mobile communications terminals can efficiently sift through and select contents files related to the current position or the guidance route.

The contents files may be divided respectively into a plurality of fragments, and the digital broadcast station may deliver the guidance files having same content a plurality of times, during a delivery period during which the fragments of the multiple types of contents files are delivered once, respectively. In accordance with this feature, even during a delivery period in which the multiple types of contents files are delivered once respectively, at the point in time that the guidance file is acquired, the respective mobile communications terminals can initiate acquisition of the fragments of the contents file that relates to the current position or the guidance route. Therefore, it is possible to advance or hasten the start timing of acquisition of the fragments of the contents files.

The association information contained in the guidance file includes updating information for the respective contents files that are associated with the identifier of the contents files and the identifier of the broadcast target area. In the mobile communications terminals, after having received a contents file, in a case that a new contents file is received which has same identifier of the contents file, when the updating information indicates updating of the content thereof, the contents information included in the new contents file may be displayed or output, whereas when the updating information does not indicate updating of the content thereof, the contents information included in the new contents file may not be displayed or output. In accordance with this feature, the processing load for processing contents files all of which include the same contents information can be reduced.

The guidance file may further include information relating to number of fragments, and when the number of fragments of a contents file to be extracted is not in agreement, the mobile communications terminals continue to store the fragments that have been received until a next delivery period. Consequently, in the case that a portion of the fragments cannot be acquired, the received fragments can be maintained, and can be provided to the next delivery cycle.

The multiple types of contents files may be classified into respective categories corresponding to content of the contents information, the guidance file or the contents files themselves may include priority information in which priority levels are defined for each of the categories in relation to display or output of the contents information, the digital broadcast station may set broadcast band or delivery period in accordance with the priority level and broadcast the contents files, and the mobile communications terminals may display or output the contents information corresponding to the priority information.

By this feature, since the contents files are broadcast by way of a broadcast band or a delivery period in accordance with a given priority level, the contents information can be delivered to the mobile communications terminals corresponding to the priority level thereof (for example, prioritized if disaster information such as a tsunami or the like is involved). Further, with the mobile communications terminals, since the contents information is displayed or output corresponding to the priority information, an appropriate display or output can be made corresponding to the priority level thereof.

An information providing method according to the present invention comprises a two-way communications step of performing two-way communications between a server and a plurality of mobile communications terminals, and a digital broadcasting step of digitally broadcasting to the plurality of mobile communications terminals from a digital broadcast station. The two-way communications step further comprises a route search request step carried out via wireless communications for transmitting from the mobile communications terminals with respect to the server a current position of each of the mobile communications terminals, and a search request for a guidance route to a destination point, a search route transmission step of transmitting the guidance route that was searched for by the server by way of wireless communications from the server with respect to each of the mobile communications terminals, and a route guidance step for performing route guidance in the mobile communications terminals using the guidance route that was obtained from the server. The digital broadcasting step further comprises a broadcasting step of digitally broadcasting contents information from the digital broadcast station with respect to the plurality of mobile communications terminals, and a contents receiving step of receiving the digital broadcast and displaying or outputting the contents information that is included in the digital broadcast, in the mobile communications terminals. The digital broadcast includes a broadcast of plural data files, each of which includes multiple types of contents files and at least one guidance file, each of the multiple types of contents files contains the contents information that is output to or displayed on the plurality of mobile communications terminals, and an identifier of the multiple types of contents files, and the guidance file contains association information, which is information that associates the identifier of the multiple types of contents files with an identifier of a broadcast target area. The contents receiving step further comprises a contents file specifying step of using the association information to specify the contents file, which is associated with the identifier of the broadcast target area that matches an identifier of a present region that includes the current position and is contained within the guidance file, or matches an identifier of a mobile plan region including the guidance route obtained from the server, a contents file extracting step of extracting the specified contents file from the digital broadcast, and a contents displaying/outputting step of displaying or outputting the contents information included in the extracted contents file.

A mobile communications terminal according to the present invention comprises a current position detector that detects a current position, a destination point input unit configured to input a destination point, a route guidance unit that displays or outputs a guidance route to the destination point, a wireless communications device that communicates with a server that searches for the guidance route, and a digital broadcast receiver that receives a digital broadcast. The digital broadcast receiver specifies multiple types of contents files and at least one guidance file from within the digital broadcast, each of the multiple types of contents files contains contents information that is output to or displayed on the route guidance unit, and an identifier of the multiple types of contents files. The guidance file contains association information, which is information that associates the identifier of the multiple types of contents files with an identifier of a broadcast target area. The route guidance unit is configured to issue a request to the server by way of the wireless communications device with the current position that was detected by the current position detector, for a search request for a guidance route to the destination point that was input to the destination point input unit, and acquire via wireless communications the guidance route that was searched for by the server. Furthermore, the route guidance unit is configured to, using the association information, specify the contents file, which is associated with the identifier of the broadcast target area that matches an identifier of a present region including the current position that is contained within the guidance file and was detected by the current position detector, or matches an identifier of a mobile plan region including the guidance route obtained from the server, extract the specified contents file from the digital broadcast through the digital broadcast receiver, and display or output the contents information included in the extracted contents file.

In a navigation system according to the present invention, route guidance is performed respectively in a plurality of mobile communications terminals having a current position detecting function. The navigation system further comprises a digital broadcast station that digitally broadcasts to the plurality of mobile communications terminals plural data files, each of which includes multiple types of contents files and at least one guidance file. Each of the multiple types of contents files contains contents information that is output to or displayed on the plurality of mobile communications terminals, and an identifier of the multiple types of contents files. The guidance file contains association information, which is information that associates the identifier of the multiple types of contents files with an identifier of a broadcast target area. Each of the plurality of mobile communications terminals is configured to comprise a digital broadcast receiver, which receives the guidance file and the multiple types of contents files, and using the association information, specify the contents file, which is associated with the identifier of the broadcast target area that matches an identifier of a present region including the current position detected by the respective mobile communications terminals, or matches an identifier of a mobile plan region including the guidance route to the destination point that was input to the mobile communications terminals, extract the specified contents file from the digital broadcast, and display or output the contents information included in the contents file extracted by the respective mobile communications terminals.

An information providing method according to the present invention provides information by a digital broadcast from a digital broadcast station with respect to a plurality of mobile communications terminals having a current position detecting function. The information providing step comprises a broadcasting step of digitally broadcasting contents information from the digital broadcast station with respect to the plurality of mobile communications terminals, and a contents receiving step of receiving the digital broadcast and displaying or outputting the contents information that is included in the digital broadcast, in the mobile communications terminals. The digital broadcast includes a broadcast of plural data files, each of which includes multiple types of contents files and at least one guidance file, each of the multiple types of contents files contains the contents information that is output to or displayed on the plurality of mobile communications terminals, and an identifier of the multiple types of contents files. The guidance file contains association information, which is information that associates the identifier of the multiple types of contents files with an identifier of a broadcast target area. The contents receiving step further comprises a contents file specifying step of using the association information to specify the contents file, which is associated with the identifier of the broadcast target area that matches an identifier of a present region including the current position detected by the mobile communications terminals, or matches an identifier of a mobile plan region including the guidance route to the destination point that was input to the mobile communications terminals, a contents file extracting step of extracting the specified contents file from the digital broadcast, and a contents displaying/outputting step of displaying or outputting the contents information included in the extracted contents file.

A mobile communications terminal according to the present invention comprises a current position detector that detects a current position, a destination point input unit configured to input a destination point, a route guidance unit that displays or outputs a guidance route to the destination point, and a digital broadcast receiver that receives a digital broadcast. The digital broadcast receiver specifies multiple types of contents files and at least one guidance file from within the digital broadcast. Each of the multiple types of contents files contains contents information that is output to or displayed on the route guidance unit, and an identifier of the multiple types of contents files, and the guidance file contains association information, which is information that associates the identifier of the multiple types of contents files with an identifier of a broadcast target area. The route guidance unit is configured to, using the association information, specify the contents file, which is associated with the identifier of the broadcast target area that matches an identifier of a present region including the current position detected by the current position detector, or matches an identifier of a mobile plan region including the guidance route to the destination point that was input to the destination point input unit, extract the specified contents file from the digital broadcast through the digital broadcast receiver, and display or output the contents information included in the extracted contents file.

In a broadcast system according to the present invention, information is provided by broadcasting from a broadcast station with respect to a plurality of communications terminals each having a current position detector. The broadcast station broadcasts to the plurality of communications terminals plural data files, each of which includes multiple types of contents files and at least one guidance file. Each of the multiple types of contents files contains contents information that is output to or displayed on the plurality of communications terminals, and an identifier of the multiple types of contents files. The guidance file contains association information, which is information that associates the identifier of the multiple types of contents files with an identifier of a broadcast target area. Each of the plurality of communications terminals comprises a broadcast receiver, which receives the guidance file and the multiple types of contents files, and using the association information, specifies the contents files, which are associated with the identifier of the broadcast target area corresponding to the current position detected by the current position detector, extracts the specified contents files from the broadcast, and displays or outputs the contents information included in the extracted contents files.

BRIEF DESCRIPTION OF DRAWINGS

FIG. 5 is a view showing an example of a relationship between priority levels and the content of contents information;

FIG. 6 is a view showing a first example of the content of a list file;

FIG. 11 is a view showing a second example of the content of a list file.

DESCRIPTION OF EMBODIMENTS

A. Embodiment
1. Description of Overall Configuration
[1-1. Overall Configuration]

Figure 1:
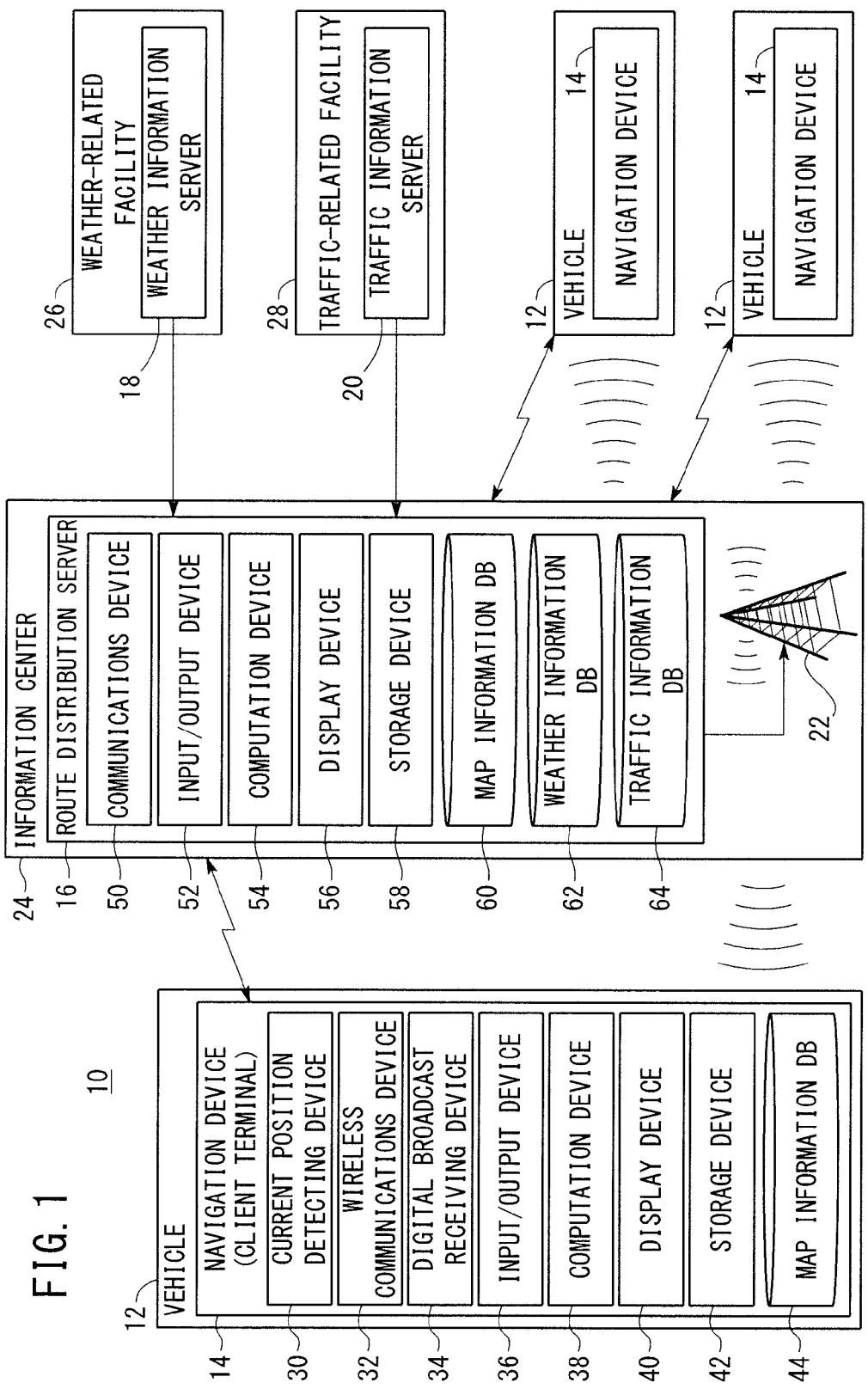
FIG. 1 is an outline overall schematic view of a navigation system according to an embodiment of the present invention.

FIG. 1 is an outline overall schematic view of a navigation system 10 (hereinafter also referred to as a "system 10") according to an embodiment of the present invention. The system 10 includes a vehicle 12 having a client terminal 14 that functions as a navigation device (hereinafter also referred to as a "navigation device 14"), a route distribution server 16 (hereinafter also referred to as a "server 16"), a weather information server 18 (hereinafter also referred to as a "server 18"), a traffic information server 20 (hereinafter also referred to as a "server 20"), and a digital broadcast station 22 (hereinafter also referred to as a "broadcast station 22").

As shown in FIG. 1, the route distribution server 16 and the digital broadcast station 22 are arranged in the same facility, more specifically, an information center 24. As will be discussed later, the route distribution server 16 and the digital broadcast station 22 may also be arranged in different facilities, respectively. Further, the weather information server 18 is arranged in a weather-related facility 26. The traffic information server 20 is arranged in a traffic-related facility 28.

According to the present embodiment, in addition to carrying out two-way communications between the respective client terminals 14 and the route distribution server 16, a digital broadcast is delivered with respect to each of the navigation devices 14 from the digital broadcast station 22. Consequently, for example, even in the event that a large-scale disaster occurs such that two-way communications cannot be performed, necessary and essential information at the time of a disaster can still be supplied to the client terminals 14. As will be discussed later, the respective client terminals 14 need not necessarily have a function of carrying out two-way communications with the route distribution server 16, and may only have a function of receiving digital broadcasts from the digital broadcast station 22.

[1-2. Navigation Device 14 (Client Terminal)]

The navigation device 14 serves to guide a user of the vehicle 12 along a route to a destination point. As will be discussed later, the navigation device 14 may also be used for purposes apart from the vehicle 12.

The navigation device 14 can take any of various forms. For example, the navigation device 14 can be a vehicle-mounted device. Alternatively, the navigation device 14 may be a portable information terminal such as a smart phone or the like that is used in combination with an in-vehicle display. Alternatively, the navigation device 14 may be a portable information terminal that includes its own display.

As shown in FIG. 1, the navigation device 14 includes a current position detecting device 30, a wireless communications device 32, a digital broadcast receiving device 34, an input/output device 36, a computation device 38, a display device 40, a storage device 42, and a map information database 44 (hereinafter referred to as a "map information DB 44").

The current position detecting device 30 detects the current position Pc of the vehicle 12 using a GPS (Global Positioning System) or the like.

The wireless communications device 32 carries out wireless communications with the server 16. However, in FIG. 1, although it is shown that wireless communications are performed directly between the vehicle 12 (wireless communications device 32) and the server 16, communications between the vehicle 12 and the server 16 may be performed over wires or wirelessly, via a communications network or a repeater or relay station.

The digital broadcast receiving device 34 receives digital broadcasts from the digital broadcast station 22, and includes a non-illustrated antenna and tuner. The digital broadcast received by the digital broadcast receiving device 34 is output to the computation device 38 after a decoding process or the like has been completed thereon. The hardware configuration of the digital broadcast receiving device 34 can use the features disclosed in JP2007-060489A, for example.

The input/output device 36 is a device for inputting and outputting information with respect to the navigation device 14, including input of a destination point, and output of a route to the destination point, etc., and includes a touch panel and a speaker. The computation device 38 performs various calculations for operational control of the various components of the navigation device 14, or for route guidance, etc. The display device 40 displays map information, etc., at the time that route guidance is carried out, and may also function or double as the input/output device 36. The storage device 42 stores various types of data and programs. The map information DB 44 accumulates and stores map information, which is used when the computation device 38 performs route guidance.

In the present embodiment, the navigation device 14 can cause a route to a destination point to be searched for in the server 16, and then perform route guidance based on the route (hereinafter also referred to as a "server route") that is notified from the server 16. As a result, highly precise value-added route guidance can be implemented. In this case, up until the server route is obtained from the server 16, the navigation device 14 may perform route guidance based on a temporary route (hereinafter referred to as a "tentative route"), which is searched for by the navigation device 14 itself. As will be discussed later, the navigation device 14 need not necessarily carry out route guidance based on the server route, and may perform route guidance based only on the tentative route.

The hardware configuration of the navigation device 14 may make use of the features disclosed in JP2007-060489A, for example.

[1-3. Route Distribution Server 16]

The route distribution server 16 searches for the server route and notifies the navigation device 14, based on the departure point, the destination point, and server search conditions, which are notified thereto from the navigation device 14.

As shown in FIG. 1, the server 16 is equipped with a communications device 50, an input/output device 52, a computation device 54, a display device 56, a storage device

58, a map information database 60 (hereinafter referred to as a "map information DB 60"), a weather information database 62 (hereinafter referred to as a "weather information DB 62"), and a traffic information database 64 (hereinafter referred to as a "traffic information DB 64").

The communications device 50 carries out communications between the respective navigation devices 14 and the wireless communications device 32. As discussed above, in FIG. 1, although it is shown that wireless communications are performed directly between the vehicle 12 (wireless communications device 32) and the server 16 (communications device 50), communications between the vehicle 12 and the server 16 may be performed over wires or wirelessly, via a communications network or a repeater or relay station.

The input/output device 52 is a device including a keyboard or a mouse that implements operations of the server 16 or the like by an administrator of the server 16 for inputting and outputting information with respect to the server 16. The computation device 54 performs various calculations for operational control of the various components of the server 16, or for searching for a server route, etc. The display device 56 displays various types of information, and may also function or double as the input/output device 52. The storage device 58 stores various types of data and programs in the server 16.

The map information DB 60 accumulates and stores map information, which is used when the computation device 54 searches for a guidance route. The map information DB 60 stores a greater amount and more finely detailed map information than the map information DB 44 of the navigation device 14.

The weather information DB 62 accumulates and stores meteorological information Imet in conjunction with the map information of the map information DB 60. The meteorological information Imet, for example, is stored information that is acquired from the weather information server 18. As such meteorological information Imet, for example, there may be included earthquake information, tsunami information, climate information, heavy rainfall or flood information, icy road surface information, typhoon information, etc.

The traffic information DB 64 accumulates and stores traffic information Itfc in conjunction with the map information of the map information DB 60. The traffic information Itfc, for example, is stored information that is acquired from the traffic information server 20. As such traffic information Itfc, for example, there may be included traffic regulation information, traffic results information, traffic congestion information, construction information, etc.

[1-4. Weather Information Server 18]

The weather information server 18 supplies the aforementioned meteorological information Imet to the route distribution server 16. The weather information server 18, in the same manner as the route distribution server 16, is equipped with a communications device, an input/output device, a computation device, a display device, a storage device, and a weather information database (none of which are shown).

[1-5. Traffic Information Server 20]

The traffic information server 20 supplies the aforementioned traffic information Itfc to the route distribution server 16. The traffic information server 20, in the same manner as the route distribution server 16, is equipped with a communications device, an input/output device, a computation device, a display device, a storage device, and a traffic information database (none of which are shown).

[1-6. Digital Broadcast Station 22]

The digital broadcast station 22 delivers digital broadcasts using a specified frequency band based on a command from the route distribution server 16. The transmission system for the digital broadcast can utilize any of various systems, including TDMA (Time Division Multiple Access), CDMA (Code Division Multiple Access), or the like.

Further, according to the present embodiment, the digital broadcast station 22 uses an IP data casting (IPDC) method. IPDC is a method by which data is distributed simultaneously by an IP protocol. The digital broadcast station 22 may also distribute data by way of other delivery technologies. Moreover, the broadcast waves from the digital broadcast station 22 may be encoded and then transmitted to the navigation device 14. In this case, a decryption device is provided in the navigation device 14.

The hardware configuration of the digital broadcast station 22 can use the features disclosed in JP2007-060489A, for example.

2. Process when Route Guidance is Performed

Figure 2:
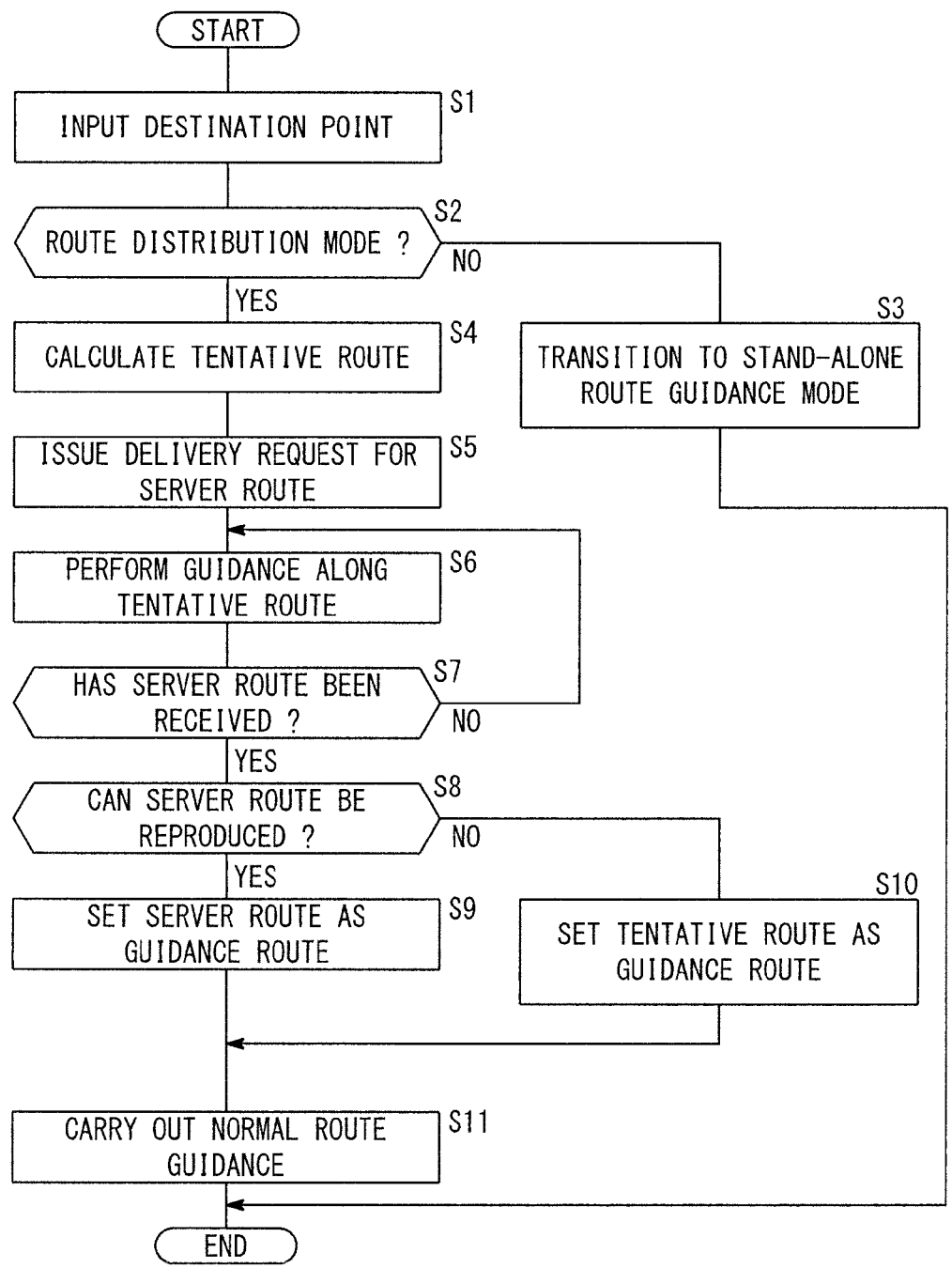
FIG. 2 is a flowchart of a process that takes place when a client terminal serving as a navigation device performs route guidance.

FIG. 2 is a flowchart of a process that takes place when the navigation device 14 performs route guidance. Prior to the navigation device 14 performing route guidance, it is necessary for selections to be made, as to a route guidance mode and server search conditions.

Among the route guidance modes, there are included a "route distribution mode" in which a route to a destination point is searched for in the server 16, and route guidance is carried out based on the server route that is notified from the server 16, and a "stand-alone route guidance mode" in which a route is not searched for in the server 16, but rather the route is searched for by the navigation device 14 itself.

Further, as the server search conditions, there may be included, for example, "fastest", "fastest (general roads)", and "fuel economy route".

The condition "fastest" is a search condition for searching for a route by which the destination point can be reached in a shortest time, which may include toll roads (expressways) in the route. The condition "fastest (general roads)" is a search condition for searching for a route by which the destination point can be reached in a shortest time using only general roads (toll free roads), which do not include toll roads in the route. The condition "fuel economy route" is a search condition for searching for a route by which emissions of carbon dioxide (fuel consumption) are minimized.

In step S1, the navigation device 14 receives and accepts an input of a destination point.

In step S2, the navigation device 14 determines whether or not the route distribution mode has been selected as the route guidance mode. If the route distribution mode has not been selected as the route guidance mode (step S2: NO), then the stand-alone route guidance mode (either "standard" or "general road priority") is selected as the route guidance mode. Thus, in step S3, the navigation device 14 transitions to the stand-alone route guidance mode, and the current process is brought to an end without issuing a delivery request to the server 16 for the server route.

If the route distribution mode is selected as the route guidance mode (step S2: YES), then in step S4, the navigation device 14 calculates a tentative route from the departure point to the destination point, based on a tentative search condition ("standard" or "general roads priority") corresponding to the server search conditions that were selected beforehand.

In step S5, the navigation device 14 issues a delivery request to the server 16 for the server route. At this time, the departure point, the destination point, and the server search conditions of the navigation device 14 (vehicle 12) are transmitted to the server 16 from the navigation device 14. The server 16, which has received the delivery request, searches for the server route based on the departure point, the destination point, and the server search conditions that were notified from the navigation device 14, and delivers the server route that was searched for to the navigation device 14.

In step S6, the navigation device 14 starts to perform guidance along the tentative route. Then, in step S7, the navigation device 14 confirms whether or not the server route has been received from the server 16. If the server route has not been received (step S7: NO), then guidance continues to be performed along the tentative route of step S6. If the server route has been received (step S7: YES), the process proceeds to step S8.

In step S8, the navigation device 14 determines whether or not the received new server route can be reproduced. If the received new server route can be reproduced (step S8: YES), then in step S9, the navigation device 14 sets the reproduced new server route formally as a route (guidance route) along which the vehicle is guided. On the other hand, if the received new server route cannot be reproduced (step S8: NO), then in step S10, instead of the new server route, the navigation device 14 sets the current tentative route formally as the guidance route. In other words, the current tentative route continues to be used as is.

Next, in step S11, the navigation device 14 uses the guidance route that was set in step S9 or step S10 to carry out normal route guidance.

3. Process when Digital Broadcast is Performed

[3-1. Summary]

According to the present embodiment, various information (contents information) is supplied to the user of the vehicle 12 using a digital broadcast to the client terminals 14 from the broadcast station 22. As such various information, there is included the aforementioned meteorological information Imet and the traffic information Itfc. For example, in the case that tsunami information is supplied by a digital broadcast as the meteorological information Imet, the tsunami warning is displayed forcibly on the display device 40 of the client terminal 14. In addition, when the tsunami warning is supplied, elevation data of the surrounding area may be included therein. Consequently, the user can easily search for high ground to avoid the tsunami. An audio or voice output may also be provided.

Figure 3:
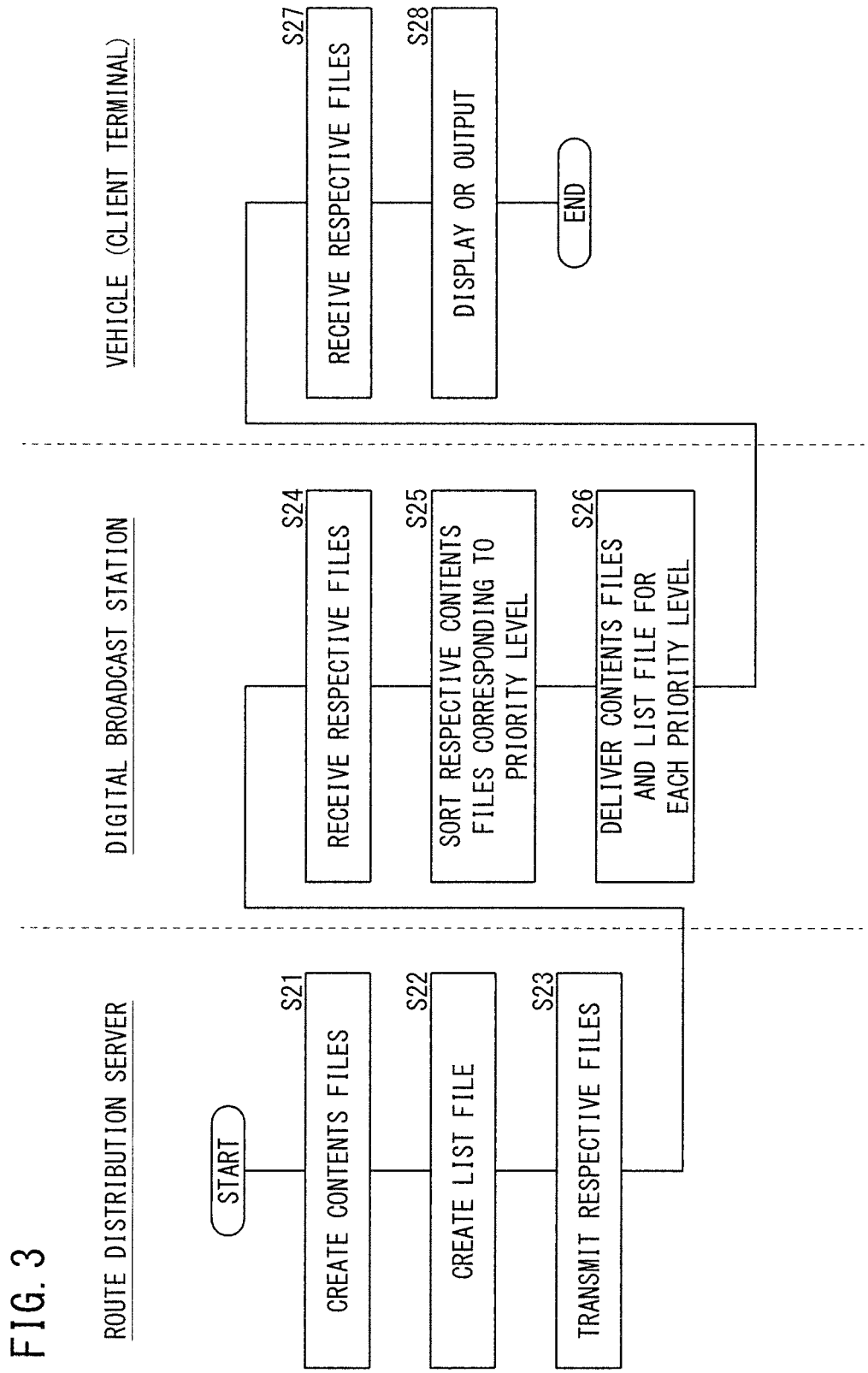
FIG. 3 is a flowchart showing a process of respective components associated with digital broadcasting.
Figure 4:
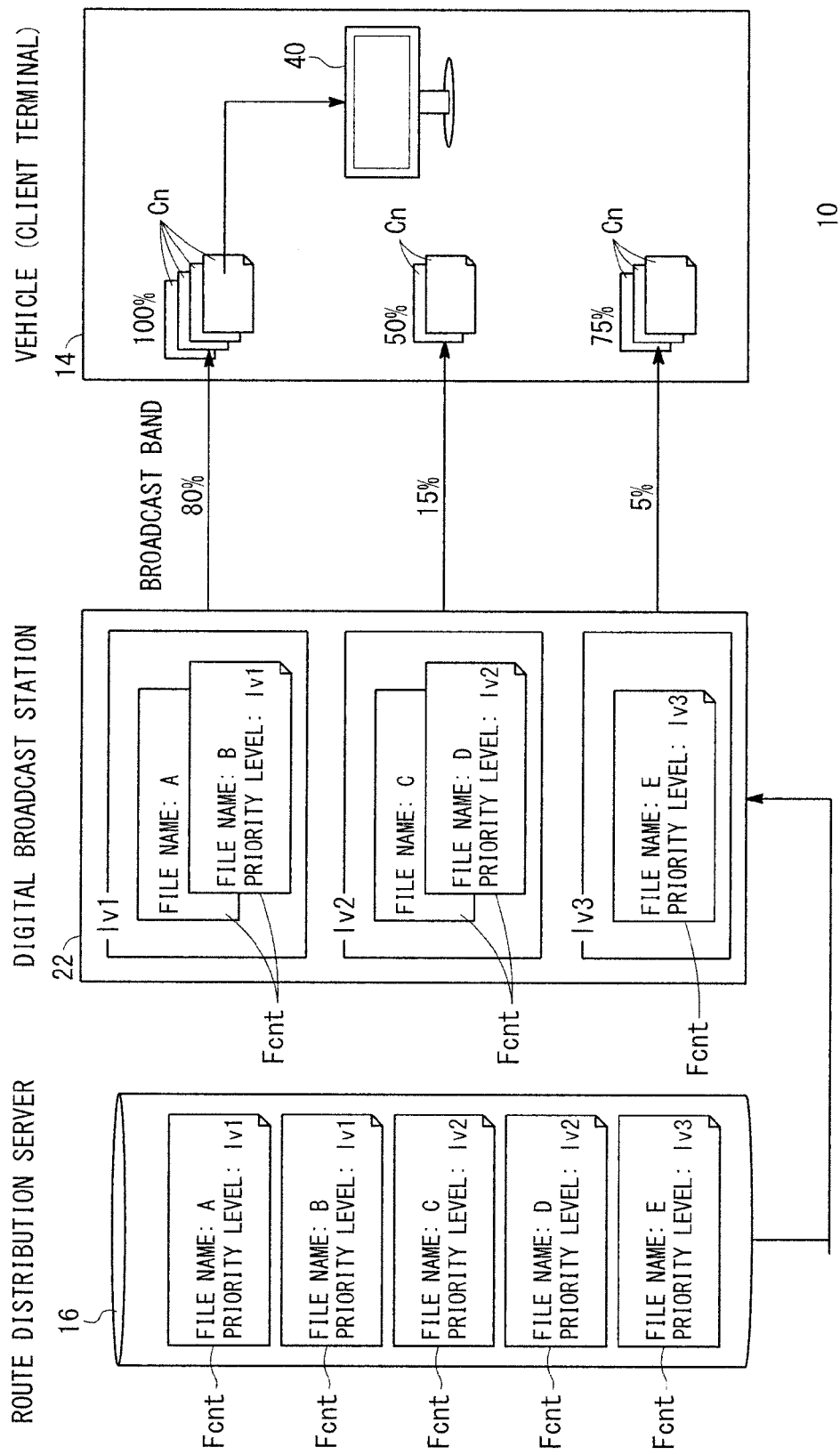
FIG. 4 is a view showing a manner in which data files, which are created by or stored in a route distribution server, are output to the client terminal through a digital broadcast station.

FIG. 3 is a flowchart showing a process of respective components associated with digital broadcasting. FIG. 4 is a view showing a manner in which data files Fdata (in particular, contents files Fcnt), which are created by or stored in the route distribution server 16, are output to the client terminals 14 through the digital broadcast station 22. In FIG. 4, "lv" is an abbreviation indicating a level of priority.

In step S21 of FIG. 3, the route distribution server 16 creates the contents files Fcnt. The contents files Fcnt will be described in detail later. In step S22, the server 16 creates a list file Flist. The list file Flist includes data that are used when the client terminal 14 receives the contents files Fcnt. The list file Flist will be described in detail later. In step S23, the server 16 transmits a data file Fdata including the contents files Fcnt and the list file Flist to the broadcast station 22.

In step S24, the broadcast station 22 receives the data file Fdata that was transmitted from the server 16. In step S25, the broadcast station 22, using priority information Ipr included in the respective contents files Fcnt, sorts the respective contents files Fcnt (corresponding to the priority level P thereof).

In step S26, the broadcast station 22 delivers the contents files Fcnt for each priority level P by way of digital broadcasting. In the event that large-scale data is sent over digital broadcast waves, if sent without modification, there is a possibility for delay or losses to occur in the contents files Fcnt. Thus, according to the present embodiment, the contents files Fcnt are divided into a plurality of fragments Cn and then sent.

However, since the full extent of the contents file Fcnt is unknown on the side of the client terminal 14, it cannot be known whether the data that has been received makes up a complete contents file Fcnt. Thus, according to the present embodiment, using the list file Flist, it is indicated in the client terminal 14 which data should be received. More specifically, in addition to the fragments Cn of the contents files Fcnt, the list file Flist also is delivered. In the present embodiment, the list file Flist is not divided into a plurality of fragments, but is sent as a single file.

In step S27, the client terminal 14 receives the data file Fdata (the contents files Fcnt and the list file Flist) from the broadcast station 22. Reception of the files may be performed over a channel that is either selected by or not selected by a non-illustrated tuner of the client terminal 14. In the case that a non-selected channel is used, the computation device 38 (see FIG. 1) controls the digital broadcast receiving device 34 so as to receive the frequency of the concerned channel at a predetermined period. Further, at this time, whether or not to extract the respective contents files Fcnt is determined based on the content of the list file Flist (to be described in detail later).

In step S28, the client terminal 14 displays or outputs the contents information Icnt in accordance with the priority information Ipr included in the contents files Fcnt.

[3-2. Contents Files Fcnt]

(3-2-1. Outline of Contents Files Fcnt)

The contents files Fcnt include contents information Icnt that is displayed or output on the navigation devices 14 (client terminals 14) of the respective vehicles 12, a file name Nf, category information Ictg, priority information Ipr, and a time stamp TS (creation date and time).

(3-2-2. Contents Information Icnt)

As contents information Icnt, for example, there are included the meteorological information Imet from the weather information server 18, and the traffic information Itfc from the traffic information server 20. The contents information Icnt is processed in the form of units that are displayed or output to the client terminal 14. Stated otherwise, the client terminal 14 is capable of displaying or outputting the contents information Icnt at a stage in which one of the contents files Fcnt is received.

(3-2-3. File Name Nf (Contents File Identifier))

The file name Nf functions as an identifier of the contents file Fcnt. The file names Nf of the respective fragments Cn have portions that are common among the respective fragments Cn, and portions that differ for each of the fragments Cn, for each contents file Fcnt.

(3-2-4. Category Information Ictg)

The category information Ictg is information indicative of classified categories for each item of content of the contents information Icnt. Among the categories, there may be included, for example, earthquake information, tsunami information, traffic results information, traffic regulation information, etc. (see FIG. 6).

(3-2-5. Priority Information Ipr)

The priority information Ipr is indicative of a priority level P in relation to the display or output of the contents information Icnt.

FIG. 5 is a view showing an example of a relationship between priority levels P and the content of the contents information Icnt. Level 1 (highest priority) in FIG. 5 is information related to an emergency warning (EWS: Emergency Warning System) broadcast. Accordingly, in relation to contents information Icnt the priority level P of which is level 1, a television receiver or a radio receiver (in the present embodiment, the display device 40 of the navigation device 14), which is in a sleep or standby state, is automatically switched on.

As contents information Icnt of level 1, for example, there are included earthquake information, tsunami information, disaster location information, traffic regulation information (level 1), traffic results information (level 1), and emergency information. The "level" in each of the contents information Icnt, similar to the priority level P, is indicative of the degree of priority or importance thereof.

In the present embodiment, elevation data is included in the tsunami information. By the display device 40 of the client terminal 14 displaying the elevation data, it becomes possible to provide a notification regarding evacuation sites (locations where the elevation is high).

The disaster location information is information relating to the position or the like of locations of recommended evacuation sites at the time of a disaster, or helpful locations following a disaster. The traffic regulation information is information concerning traffic regulations (areas that are closed to traffic, speed limits, etc.). The traffic results information is information indicative of the roads on which the vehicle 12 is traveling. By transmitting position information (the current position Pc) from the vehicle 12 to the server 16, the server 16 aggregates and obtains such data. The emergency information is information in relation to other content needed in the event of an emergency, apart from the information described above.

Level 2 (priority level: high) is disaster information other than that provided in level 1. For this reason, in relation to contents information Icnt the priority level P of which is level 2, it is not necessary for the display device 40, which is in a standby state, to be switched on automatically. Stated otherwise, how the level 2 contents information Icnt is handled can be determined by a program that is executed by the client terminal 14.

As contents information Icnt of level 2, for example, there are included weather information, heavy rain information, flood information, road surface freezing information, typhoon information, traffic regulation information (level 2), and traffic results information (level 2). The weather information referred to herein includes rain and snow information, for example.

Level 3 (priority level: low) is information other than at the time of a disaster. For this reason, in relation to contents information Icnt the priority level P of which is level 3, it is not necessary for the display device 40, which is in a standby state, to be switched on automatically. Stated otherwise, how the level 3 contents information Icnt is handled can be determined by a program that is executed by the client terminal 14. At this time, a distinction may be attached to handling of the information of levels 2 and 3, respectively.

The identifiers "00", "01" and "02" are assigned as identifiers (priority level identifiers IDp) for each of the levels 1 through 3, respectively. Consequently, the client terminal 14 can confirm the priority level P based on the priority level identifiers IDp.

Note that, although the priority level identifiers IDp are included in the contents files Fcnt, such identifiers may be included in the list file Flist instead.

(3-2-6. Time Stamp TS (Updating Information))

The time stamp TS indicates the date and time at which the contents files Fcnt were created. The time stamp TS in the present embodiment is used as information (updating information) when it is determined whether or not the contents files Fcnt in the client terminals 14 need to be updated. As a time stamp TS, for example, there can be indicated information such as "YYYYMMDD-hhmmss" (year, month, day, hour, minutes, seconds).

Other than the time stamp TS, for example, version information can also be used as updating information, assuming that such version information is included in the file name Nf, or version information other than in the file name Nf is included in the contents files Fcnt.

[3-3. List File Flist]

As described above, the list file Flist includes data that are used when the client terminal 14 receives the contents files Fcnt. The list file Flist includes information (association information Ir) that associates the file names Nf, which serve as identifiers for the contents files Fcnt (contents file identifiers), with identifiers IDbrd of the broadcast target area Zbrd.

The identifier IDbrd of the broadcast target area Zbrd (hereinbelow referred to as a "broadcast target area identifier IDbrd") is a code (e.g., a numerical value) that is used for identifying the target broadcast area Zbrd. The target broadcast area Zbrd in this case is an area in which map information thereof is separated by predetermined rules for thereby specifying the reception area of the contents files Fcnt. The predetermined rules referred to above, for example, can use a two dimensional mesh shape (checkerboard shape) (see FIG. 10), a honeycomb shape, or an equilateral triangle shape (a shape in which equilateral triangles are combined in an alternating vertically inverted form).

FIG. 6 is a view showing a first example of the content of the list file Flist. As shown in FIG. 6, in the list file Flist, the file names Nf of various types of contents files Fcnt (e.g., "Area_A-Earthquake.bin", "513304-Traffic.bin") are stored as contents file identifiers for each of the broadcast target area identifiers IDbrd. Note that ".bin" in this case is a file extension that indicates a binary code.

Further, the file names Nf of the fragments Cn, for example, may include numbers "-1", "-2" therein that indicate the ordinal number of the fragments Cn as in "Area_A-Earthquake-1.bin", "Area_A-Earthquake-2.bin". Furthermore, although it is not indicated in FIG. 6, in the list file Flist of the present embodiment, the number of the fragments Cn of the contents files Fcnt is included.

Moreover, as shown in FIG. 6, corresponding to the identifier IDbrd "513304", the file "Area_X-Tsunami.bin" that is associated with tsunami information and the file "Area_A-Earthquake.bin" that is associated with the earthquake information are corresponded. Even if the same identifier IDbrd "513304" is used, different areas (areas A, X) can be made to correspond with each other.

As will be discussed later, in the client terminal 14, an identifier IDv of a present region Zv including the current position Pc, and an identifier IDs of a surrounding region Zs are specified. The regions Zv, Zs are set to the same size as that of the broadcast target area Zbrd. In addition, the client terminal 14 specifies the file names Nf of the contents files Fcnt that are associated with the broadcast target area IDbrd that matches the specified identifiers IDv, IDs, and extracts from the digital broadcast the contents files Fcnt having the specified file names Nf.

As shown in FIG. 6, 6-digit numbers (e.g., "513304") are used as identifiers IDbrd of the broadcast target areas Zbrd. Further, a region that contains a plurality of broadcast target areas Zbrd is described by the term "area". Basically, in the contents files Fcnt, although the identifier IDbrd is given thereto, in exceptional circumstances, an "area name" may also be given. Concerning creation of the list file Flist, note that the list file Flist is updated every time that a contents file Fcnt therein is created.

[3-4. Processing in Digital Broadcast Station 22]

Figure 7:
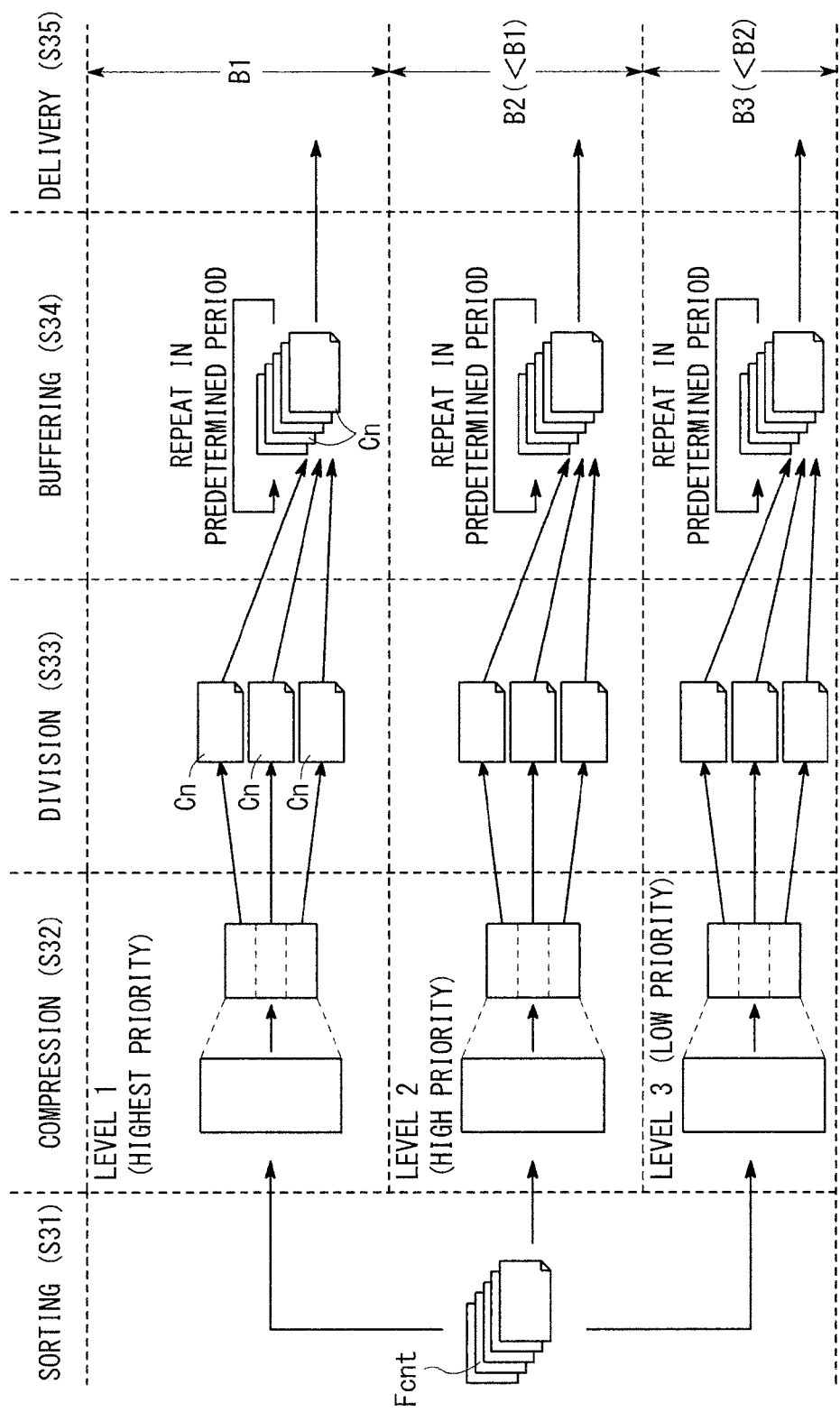
FIG. 7 is a view showing in simplified form processing performed in the digital broadcast station.

FIG. 7 is a view showing in simplified form the processing performed in the digital broadcast station 22. Basically, the process shown in FIG. 7 progresses from the left side to the right side of the drawing. In step S31 of FIG. 7, the broadcast station 22 sorts the contents files Fcnt received from the server 16 corresponding to the priority level P thereof. More specifically, referring to FIG. 4, the contents files Fcnt are divided into a group made up of items the degree of importance of which is level 1 (highest importance), a group made up of items the degree of importance of which is level 2 (priority level: high), and a group made up of items the degree of importance of which is level 3 (priority level: low). Further, the list file Flist is sorted as being of level 1 (highest importance).

In step S32, the broadcast station 22 performs data compression on the contents files Fcnt and the list file Flist, respectively. For example, the respective files are compressed into zip files. At this time, the file names Nf preferably are the same apart from their file extensions, so as not to change before and after compression and before and after future extraction thereof.

In step S33, the broadcast station 22 divides the respective contents files Fcnt into fragments Cn. The file names Nf of the respective fragments Cn have portions that are common among the respective fragments Cn that make up each contents file Fcnt, and portions that differ for each of the fragments Cn. According to the present embodiment, the list file Flist is not divided.

It should be noted that the division or fragmentation herein differs from the division that is used for communications from the server 16 to the broadcast station 22 and for delivery of the digital broadcast from the broadcast station 22 to the client terminals 14. For example, using an asynchronous transfer mode (ATM), which is one type of transmissions technique, although the data to be transferred is divided into fixed length cells, with the division or fragmentation that is carried out in step S33, transmission is performed in units of fragments Cn having the file name Nf, which is different from a transmission technique such as ATM. In other words, the fragments Cn in the present embodiment are restored into the contents files Fcnt using the list file Flist.

In step S34, the broadcast station 22 buffers the respective contents files Fcnt and the list file Flist, which have been divided.

Figure 8:
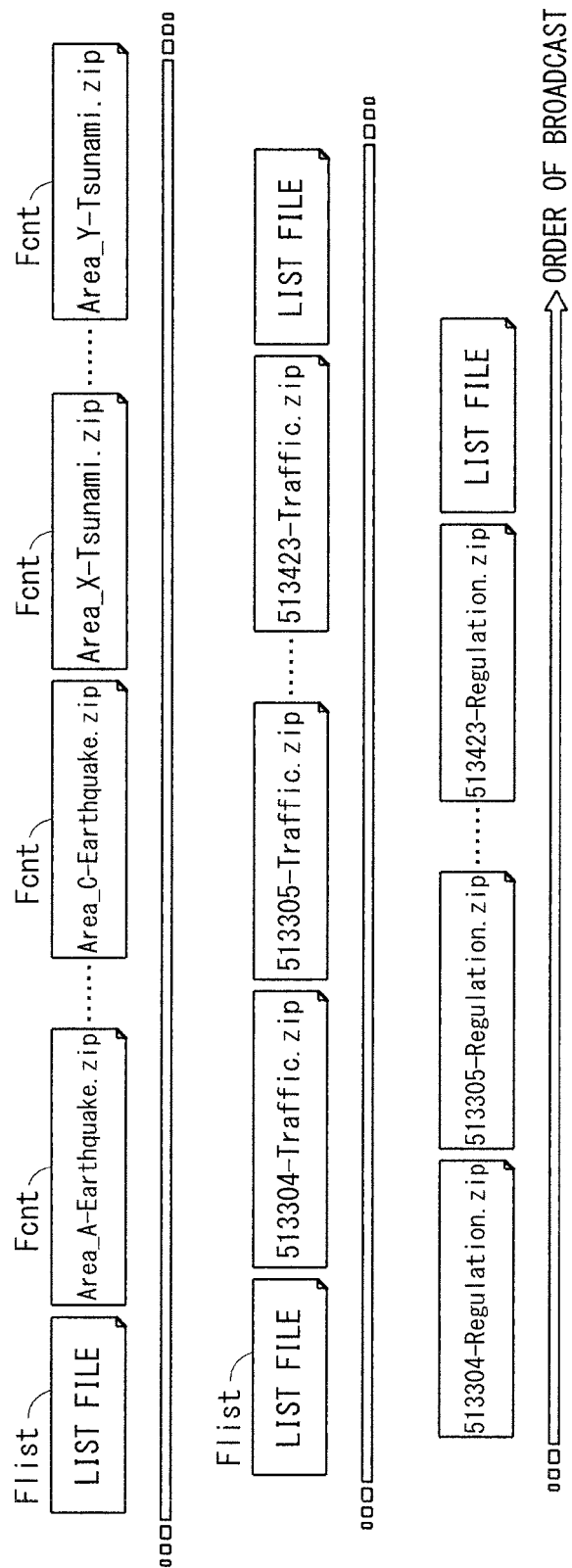
FIG. 8 is a view showing in simplified form an order of respective data files when the digital broadcast station transmits data files having a level 1 (most important) priority.

FIG. 8 is a view showing in simplified form an order of respective data files Fdata when the digital broadcast station 22 transmits data files Fdata having a level 1 (most important) priority level P. Although as described above, in step S33, the respective contents files Fcnt are divided into a plurality of fragments Cn, it should be noted that, to facilitate understanding, in FIG. 8, the respective contents files Fcnt are shown as being collected together as one (the fragments Cn thereof are not shown). Further, in FIG. 8, a case (i.e., a delivery period of level 1 entirely) is shown, in which all of the contents files Fcnt of level 1, which were buffered in step S34, are delivered at one time.

The broadcast station 22 repeatedly sends the level 1 data files Fdata at a predetermined period in the order shown in FIG. 8. The term "predetermined period" implies a period until the broadcast period (including a number of broadcasts) that is set for the respective data files Fdata is completed, or until the data files Fdata of the same file name are updated. The broadcast period can be an interval from 1 to 10 minutes, for example.

As shown in FIG. 8, the list file Flist of the same content is delivered multiple times in one delivery period. Stated otherwise, the delivery period (list file delivery period) of the list file Flist itself is set to be shorter than the delivery period (contents file delivery period=delivery period of level 1 entirely) for the respective contents files Fcnt.

According to this feature, at the point in time that the list file Flist is acquired during one of the contents file delivery periods, fragments Cn associated with the current position Pc of the client terminal 14 can start to be acquired. Consequently, it is possible to advance or hasten the start timing of acquisition of the fragments Cn.

Further, as described above, since the list file delivery period is shorter than the contents file delivery period, the broadcast station 22 can insert the list file Flist into a row of contents files Fcnt at each of a predetermined number of the contents files Fcnt.

In step S35 of FIG. 7, the broadcast station 22 delivers the fragments Cn of the contents files Fcnt and the list file Flist by way of a digital broadcast.

As shown in FIG. 7 etc., in the present embodiment, the broadcast bands B1 to B3 are differentiated corresponding to the priority levels P. For example, if the sum of all of the broadcast bands B1 to B3 is 100%, the level 1 (highest importance) broadcast band B1 thereamong is allocated to 80%, the level 2 (priority level: high) broadcast band B2 is allocated to 15%, and the level 3 (priority level: low) broadcast band B3 is allocated to 5%.

Further, the allocation ratios apply not only to the priority levels P, but may be changed based on the number of the contents files Fcnt (including the number of fragments Cn) at each of the priority levels P, the amount of data, and the delivery count or number of times (or the time stamp TS). For example, the bands B1 to B3 of levels having a small number of contents files Fcnt or a small data amount can be made narrow, whereas the bands B1 to B3 of levels having a large number of contents files Fcnt or a large data amount can be made wide. Alternatively, the bands B1 to B3 of levels having a large number of delivery times or an older value (average value) of the time stamps TS can be made narrow, whereas the bands B1 to B3 of levels having a small number of delivery times or a newer value of the time stamps TS can be made wide.

According to the present embodiment, the contents files Fcnt can be delivered repeatedly. For example, in the case of a tsunami warning, the same information is delivered repeatedly in a predetermined broadcast period (e.g., once every minute) until the information is updated. Therefore, the delivered fragments Cn of the contents files Fcnt are buffered again (step S34). The number of times that repeated delivery thereof is carried out is set in the server 16 or the broadcast station 22.

A portion or all of the processing carried out in the broadcast station 22 as described above (excluding the delivery step S35) may also be performed in the server 16.

[3-5. Processing in Client Terminal 14]

Figure 9:
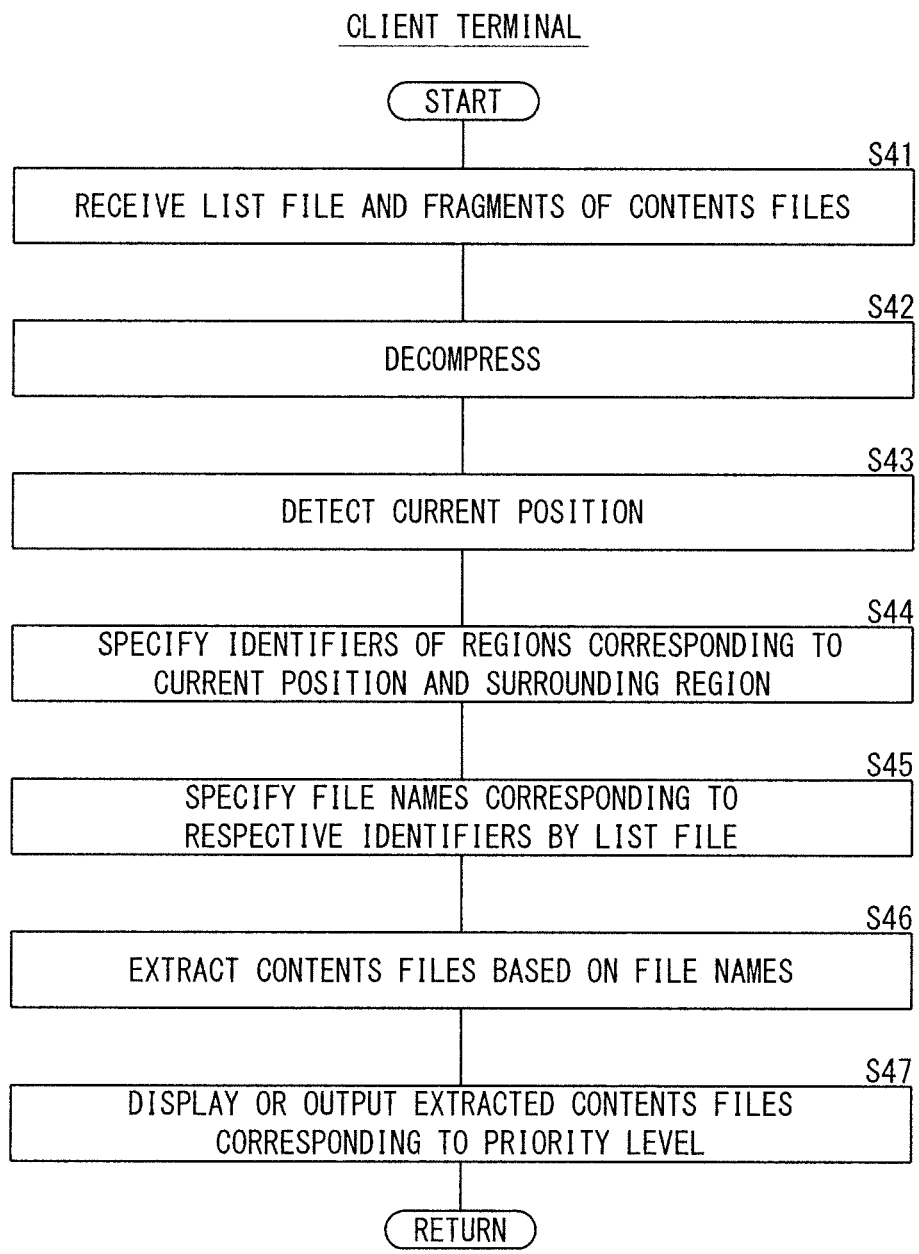
FIG. 9 is a flowchart of a process that takes place in the client terminal.
Figure 10:
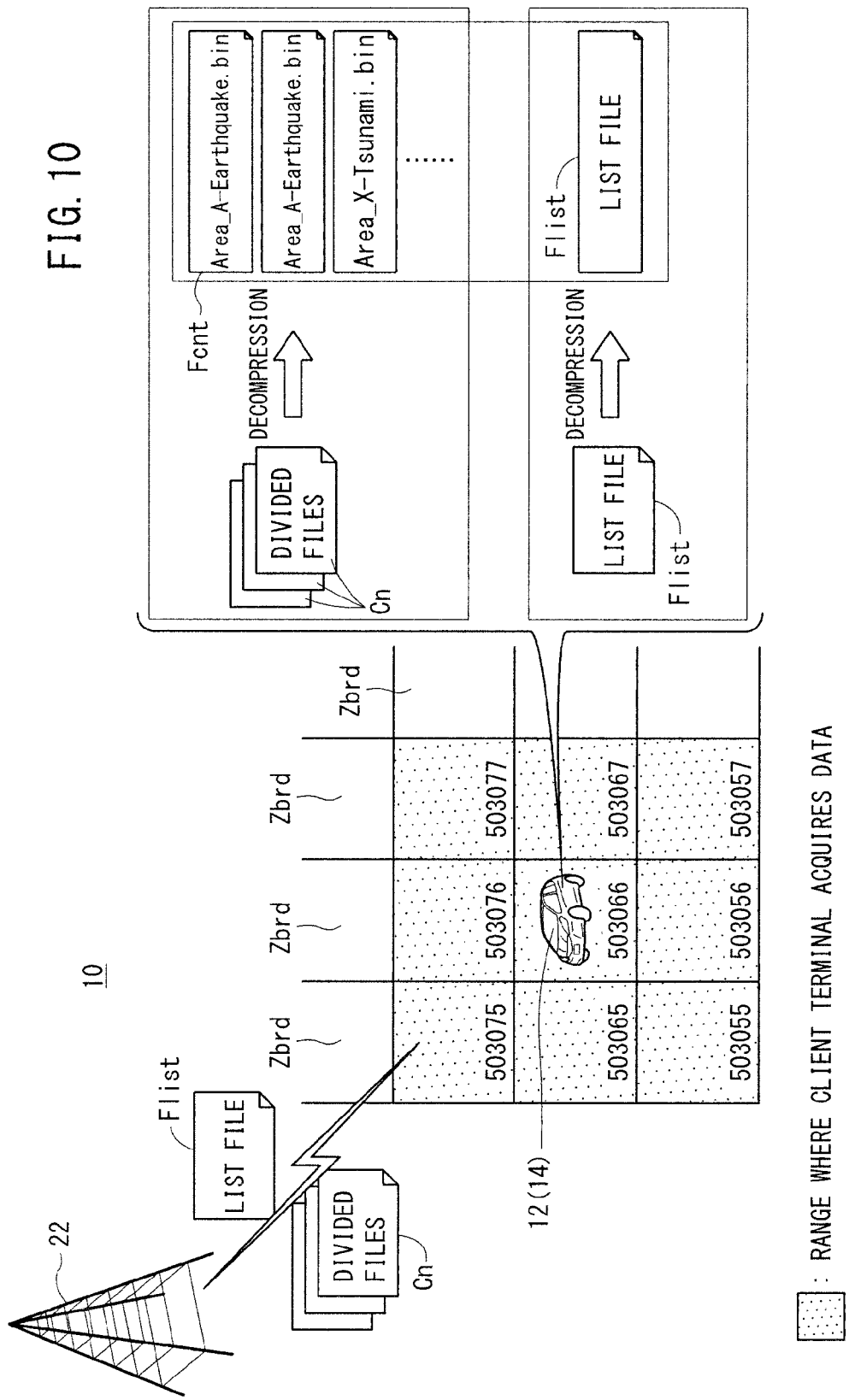
FIG. 10 is a view showing in simplified form processing performed in the client terminal.

FIG. 9 is a flowchart of a process that takes place in the client terminal 14. FIG. 10 is a view showing in simplified form the processing performed in the client terminal 14.

In step S41 of FIG. 9, the client terminal 14 receives the data file Fdata that was delivered from the broadcast station 22, more specifically, the fragments Cn of the contents files Fcnt and the list file Flist.

In step S42, the client terminal 14 decompresses each of the received data files Fdata, respectively. The contents files Fcnt are extracted or decompressed, after all of the fragments Cn are gathered. Furthermore, in the case that a portion of the fragments Cn is missing and the contents file Fcnt cannot be completed, the extracted fragments Cn are retained for a predetermined period of time. If all of the fragments Cn have been gathered within the predetermined time period, then they are used in a process to be described later, if a portion thereof is missing even though the predetermined period has elapsed, the client terminal 14 deletes the fragments Cn. As the predetermined period, a delivery period of the plurality of contents files (=a delivery period of level 1 entirely) can be used.

Moreover, in the case that the file names Nf of the fragments Cn before decompression can be specified for each fragment Cn by the list file Flist, and the time stamps TS prior to decompression can be confirmed, then the fragments Cn having the same file names Nf and the same time stamp values TS may be deleted prior to compression thereof.

In step S43, the client terminal 14 detects the current position Pc using the current position detecting device 30. In step S44, the client terminal 14 specifies an identifier (present region identifier IDv) of the region (present region Zv) to which the current position Pc belongs, and an identifier (surrounding region identifier IDs) of one or a plurality of surrounding regions Zs that lie adjacent to the present region Zv.

For specifying the present region identifier IDv, a map that associates the position information (current position Pc) with the identifier IDv is stored beforehand in the map information DB 44 of the client terminal 14. Therefore, the client terminal 14 can specify the identifier IDv in accordance with the current position Pc, and can specify the identifier IDs based on the identifier IDv and the planned route of the vehicle 12.

For example, in the case that the present region Zv is the region indicated by "503066" in FIG. 10, then eight surrounding regions Zs around the present region Zv1 (the area indicated by [503055] to [503057], [503065], [503067], and [503075] to [503077] in FIG. 10) is defined as the surrounding region Zs. Alternatively, one or three regions in front of the vehicle 12 in the traveling direction of the vehicle 12 may be defined as the surrounding region Zs. Alternatively, three regions in front of the vehicle 12 in the traveling direction thereof and two regions on the left and right of the vehicle 12 (a total of five regions) can be defined as the surrounding region Zs.

In step S45, the list file Flist is referred to concerning the present region identifier IDv and the surrounding region identifier IDs that were specified in step S44, and the client terminal 14 specifies or identifies the file names Nf that are associated with the broadcast target area identifier IDbrd that matches with the respective identifiers IDv, IDs.

FIG. 11 is a view showing a second example of the content of the list file Flist. For example, in the case that the present region identifier IDv is [523857], the client terminal 14 specifies or identifies the file names Nf that are associated with the broadcast target area identifier IDbrd that matches with the respective identifiers IDv, and more specifically, specifies the file name "Year_2012-Typhoon_No10.bin" in the second line, the file name "523857-Regulation.bin" in the third line, and the file name "523857-Traffic.bin" in the sixth line of FIG. 11.

Further, as can be understood from FIG. 11, in the case that the contents information Icnt included in the contents files Fcnt cannot be clearly divided into units of the broadcast target areas Zbrd, a plurality of identifiers IDbrd may be allocated with respect to a single contents file Fcnt.

In step S46 of FIG. 9, the client terminal 14 extracts the contents files Fcnt based on the file names Nf that were specified in step S45. More specifically, the client terminal 14 extracts file names Nf from among the contents files Fcnt that were decompressed in step S42, and which match with the file names Nf specified in step S45.

However, the client terminal 14 determines whether or not contents files Fcnt of the same file names Nf have already been extracted, and if so, compares the time stamps TS (creation date and time) thereof. In addition, if the time stamps TS are the same, the client terminal 14 does not extract the new contents files Fcnt. On the other hand, if the time stamps TS are newer, the client terminal 14 extracts the new contents files Fcnt. In this manner, depending on the situation, it is possible to carry out the relevant processes before the decompression step (step S42).

In step S47, the client terminal 14 displays or outputs the contents files Fcnt that were extracted in step S46 corresponding to the priority level P thereof. For example, in the case that the priority level P is level 1 (highest priority), a switch is turned on automatically and broadcasting is performed, even if the display device 40 is in a standby state.

At this time, information of the present region Zv and the surrounding region Zs (mesh information of the map) is displayed on the display device 40. In addition, rainfall/snowfall information and tsunami information are rendered on the map. In the foregoing manner, in the case of tsunami information, elevation data is possessed by the map, and appropriate information in the event of a disaster are displayed. Furthermore, location information or traffic restrictions (traffic stoppage, etc.) relating to the disaster may be displayed as position information on the map screen. Further still, traffic results information can be displayed on the map screen.

Further, in the case that the priority level P is level 1 (highest priority), each time that a time stamp TS is updated, the client terminal 14 interrupts for one minute the display, on the route guidance screen at that time, of the contents information Icnt included in the contents files Fcnt. When the highest priority contents information Icnt is displayed or output, the client terminal 14 stops operations of a non-illustrated audio device or a video screen.

Further, in the example shown in FIG. 11, at a point in time when the file name "Year_2012-Typhoon_No10.bin" is extracted, the contents information Icnt included in the contents files Fcnt are displayed or output. Thereafter, when the file name "523857-Regulation.bin" in the third line of FIG. 11 is extracted, the contents information Icnt included in the contents files Fcnt at that time are displayed or output. Similarly, when the file name "523857-Traffic.bin" in the sixth line of FIG. 11 is extracted, the contents information Icnt included in the contents files Fcnt at that time are displayed or output.

In the client terminal 14 shown in FIG. 4, the numerical values "100%", "50%", and "75%" that are shown above the respective fragments Cn are indicative of the reception ratio in the totality of the contents files Fcnt. Since 100% of the level 1 fragments Cn are acquired, an output or display thereof on the display device 40 is carried out.

Further, in the event that contents files Fcnt of a plurality of priority levels P are received simultaneously, the client terminal 14 may use only one group of the contents files Fcntl having a high priority level P.

4. Advantages of the Present Embodiment

As has been described above, according to the present embodiment, with the plurality of client terminals 14 (mobile communications terminals), based on the list file Flist (guidance file) that is included in the digital broadcast, contents files Fcnt to be extracted can be specified. Therefore, in each of the client terminals 14, contents information Icnt corresponding to the current position Pc can be obtained, and displayed or output with ease.

Further, with the respective client terminals 14, in addition to referring to the list file Flist, the contents files Fcnt to be extracted can be specified by monitoring the file names Nf (contents file identifiers) of the contents files Fcnt. Therefore, it becomes unnecessary to confirm the content of the contents information Icnt within the contents files Fcnt. Accordingly, the respective client terminals 14 can efficiently sift through and select contents files Fcnt related to the current position Pc.

In the present embodiment, the contents files Fcnt are divided respectively into a plurality of fragments Cn (step S33 of FIG. 7), and the digital broadcast station 22 delivers the list file Flist of the same content a plurality of times, during a delivery period (contents file delivery period=delivery period of level 1 entirely) in which the respective contents files Fcnt are delivered once (see FIG. 8).

According to this feature, at the point in time that the list file Flist is acquired, even during the contents file delivery periods, fragments Cn associated with the current position Pc of the client terminal 14 can start to be acquired. Consequently, it is possible to advance or hasten the start timing of acquisition of the fragments Cn.

In the present embodiment, the association information Ir contained in the list file Flist (guidance file) includes time stamps TS (updating information) that are associated with the file names Nf (identifier of the contents files) and the broadcast target area identifier IDbrd. In the client terminals 14, after having received a certain contents file Fcnt, in the case that a newer contents file Fcnt is received which has the same file names Nf therein, if the time stamps TS are newer, the contents information Icnt included in the new contents file Fcnt is displayed or output, whereas if the time stamps TS are the same, the contents information Icnt included in the new contents file Fcnt is not displayed or output (steps S46 and S47 of FIG. 9). In accordance with this feature, the processing load for processing contents files Fcnt all of which include the same contents information Icnt can be reduced.

In the present embodiment, the list file Flist includes information relating to the number of fragments Cn, and if the number of fragments Cn of a contents file Fcnt to be extracted is not in agreement, the client terminals 14 continue to store the fragments Cn that have been received until the next contents file delivery period. Consequently, in the case that a portion of the fragments Cn cannot be acquired, the fragments Cn following reception can be maintained, and can be provided to the next delivery cycle.

In the present embodiment, the multiple types of contents files Fcnt are classified into respective categories corresponding to the content of the contents information Icnt, the list file Flist (guidance file) or the contents files Fcnt include priority information Ipr in which priority levels P are defined for each of the categories in relation to the display or output of the contents information Icnt, the digital broadcast station 22 sets the broadcast band B1 to B3 or the delivery period in accordance with the priority level P and broadcasts the contents files Fcnt, and the client terminals 14 display or output the contents information Icnt corresponding to the priority information Ipr (see FIGS. 4 and 8).

By this feature, since the contents files Fcnt are broadcast by way of a broadcast band B1 to B3 or a delivery period in accordance with the priority level P, the contents information Icnt can be delivered to the client terminals 14 corresponding to the priority level P thereof (for example, prioritized if disaster information such as a tsunami or the like is involved). Further, in the client terminals 14, since the contents information Icnt is displayed or output corresponding to the priority information Ipr, an appropriate display or output can be made corresponding to the priority level P thereof.

B. Modifications

The present invention is not limited to the above embodiment, and as a matter of course, various alternative or modified configurations may be adopted therein based on the descriptive content of the present specification. For example, the following configurations can be adopted.

1. Vehicle 12 (Object to which the Invention is Applied)

In the present embodiment, the client terminal 14 is used in a vehicle 12. However, the client terminal 14 can be applied to other uses. For example, the client terminal 14 can be applied to mobile bodies such as airplanes, ships, and the like. Alternatively, the client terminal 14 can be used as a portable communication means such as a portable telephone or the like.

2. Digital Broadcast Station 22

Although according to the present invention, the route distribution server 16 carries out control of the broadcast station 22 (refer to FIG. 1), taking into consideration, for example, that supply of information by broadcasting is differentiated from route distribution carried out by two-way communications, the broadcast station 22 may perform broadcasting independently from the route distribution server 16. In this case, a server apart from the route distribution server 16 (a server that does not perform route guidance) may be provided to manage the broadcast station 22.

3. Broadcasting

[3-1. Broadcasting in General]

According to the above embodiment, although broadcasting from the broadcast station 22 is carried out as a digital broadcast, insofar as attention is directed to carrying out one-way communications, an analog broadcast may also be used.

According to the above embodiment, although the contents files Fcnt are first divided into fragments Cn and then delivered, insofar as attention is focused on the other characteristics (for example, the point of sorting the contents files Fcnt in accordance with the priority level P thereof), the contents files Fcnt may be delivered without being divided.

[3-2. List File Flist (Guidance File)]

According to the above embodiment, although the list file Flist includes information concerning the number of fragments Cn, insofar as attention is focused on the other characteristics (for example, the point of sorting the contents files Fcnt for the priority level P thereof), information concerning the number of fragments Cn need not necessarily be included therein.

[3-3. Broadcast Target Area Identifier IDbrd]

According to the above embodiment, although the broadcast target area identifier IDbrd is included in the list file Flist, for example, insofar as attention is paid to delivering the identifier IDbrd, the broadcast target area identifier IDbrd can be omitted from inclusion in the list file Flist. For example, the identifier IDbrd may be included in the contents files Fcnt.

[3-4. Priority Information Ipr]

According to the above embodiment, the priority level P is divided into three stages (levels 1 through 3). However, the priority level P may be divided into two stages or four or more stages.

According to the above embodiment, the priority information Ipr is used. However, for example, assuming that attention is applied to use of the list file Flist, use of the priority information Ipr can be dispensed with.

4. Client Terminals 14

In the example of FIG. 10, contents files Fcnt are acquired concerning the present region Zv to which the current position Pc belongs, and concerning the surrounding region Zs adjacent to the present region Zv. However, insofar as attention is focused on the other characteristics (for example, the point of sorting the contents files Fcnt for the priority level P thereof), the invention is not restricted to this feature. For example, contents files Fcnt may be acquired concerning only the present region Zv or the surrounding region Zs.

Alternatively, in addition to or in place of at least one of the present region Zv and the surrounding region Zs, contents files Fcnt may be acquired concerning all or a portion of a region (a mobile plan region Zd) to which the guidance route obtained from the server 16 or the guidance route calculated by the navigation device 14 belongs. In accordance with this feature, not only the current position Pc, or in place of the current position Pc, contents information Icnt is supplied in relation to a route to the destination point. Therefore, the user can accurately grasp the situation of a future route.

The respective client terminals 14 of the above embodiment include both the function of carrying out two-way communications with the route distribution server 16 (two-way communications function), and the function of receiving digital broadcasts from the digital broadcast station 22 (digital broadcast receiving function). However, for example, insofar as attention is focused on the digital broadcast receiving function, the respective client terminals 14 need not necessarily include the two-way communications function. In this case, the respective client terminals 14 do not carry out route guidance based on the server route, but may perform route guidance based only on the tentative route. Alternatively, although the respective client terminals 14 include the current position detecting function, without performing route guidance, a broadcast may be received corresponding to the current position or a surrounding position around the current position.

The invention claimed is:

1. An information providing method, comprising a two-way communications step of performing two-way communications between a server and a plurality of mobile communications terminals, and a digital broadcasting step of digitally delivering and broadcasting to the plurality of mobile communications terminals from a digital broadcast station, wherein:

the two-way communications step further comprises:

a route search request step carried out via wireless communications for transmitting from the mobile communications terminals with respect to the server a current position of each of the mobile communications terminals, and a search request for a guidance route to a destination point;

a search route transmission step of transmitting the guidance route that was searched for by the server by way of wireless communications from the server with respect to each of the mobile communications terminals; and a route guidance step for performing route guidance in the mobile communications terminals using the guidance route that was obtained from the server;

the digital broadcasting step further comprises:

a broadcasting step of digitally delivering and broadcasting contents information from the digital broadcast station with respect to the plurality of mobile communications terminals; and a contents receiving step of receiving the digital delivery and broadcast and displaying or outputting the contents information that is included in the digital delivery and broadcast, in the mobile communications terminals;

the digital delivery and broadcast includes sequential delivery of plural data files, each of which includes multiple types of contents files and guidance file for selecting and extracting a contents file to be displayed, from among the contents files;

each of the multiple types of contents files contains the contents information that is output to or displayed on the mobile communications terminals, and a contents information identifier corresponding to the contents information;

the guidance file contains association information, which is information that associates the contents information identifier included in the multiple types of contents files with an area identifier, the area identifiers each being given correspondingly to each of plural areas divided in the broadcast target area of the digital delivery and broadcast;

in the broadcasting step, same guidance file is delivered multiple times in one delivery period of the multiple types of contents files; and the contents receiving step further comprises:

a contents file specifying step of specifying the contents file, which corresponds to the contents information identifier associated with the area identifier that matches an area identifier of a present region that includes the current position contained within the guidance file, or matches an area identifier of a mobile plan region including the guidance route obtained from the server;

a contents file extracting step of extracting only the specified contents file from the digital delivery and broadcast; and a contents displaying/outputting step of displaying or outputting, in the mobile communications terminals, the contents information included in the extracted contents file.

2. A mobile communications terminal comprising:

a current position detector that detects a current position;

a destination point input unit configured to input a destination point;

a route guidance unit that displays or outputs a guidance route to the destination point;

a wireless communications device that communicates with a server that searches for the guidance route; and a digital broadcast receiver that receives a digital delivery and broadcast;

wherein the digital broadcast receiver sequentially receives multiple types of contents files and guidance file for selecting and extracting, from among the contents files, a contents file to be displayed, from within the digital delivery and broadcast;

each of the multiple types of contents files contains contents information that is output to or displayed on the route guidance unit, and a contents information identifier corresponding to the contents information;

the guidance file contains association information, which is information that associates the contents information identifier included in the multiple types of contents files with an area identifier, the area identifiers each being given correspondingly to each of plural areas divided in the broadcast target area of the digital delivery and broadcast, and same guidance file is delivered multiple times in one delivery period of the multiple types of contents files; and the route guidance unit is configured to:

issue a request to the server by way of the wireless communications device with the current position that was detected by the current position detector, for a search request for a guidance route to the destination point that was input to the destination point input unit; and acquire via the wireless communications device the guidance route that was searched for by the server; and furthermore, the route guidance unit is configured to:

specify the contents file, which corresponds to the contents information identifier associated with the area identifier of the broadcast target area that matches an area identifier of a present region including the current position that is contained within the guidance file and was detected by the current position detector, or matches an area identifier of a mobile plan region including the guidance route obtained from the server;

extract only the specified contents file from the digital delivery and broadcast through the digital broadcast receiver; and display or output the contents information included in the extracted contents file.

3. An information providing method that provides information by a digital delivering and broadcast from a digital broadcast station with respect to a plurality of mobile communications terminals having a current position detecting function:

the information providing method comprising:

a broadcasting step of digitally delivering and broadcasting contents information from the digital broadcast station with respect to the plurality of mobile communications terminals; and a contents receiving step of receiving the digital delivery and broadcast and displaying or outputting the contents information that is included in the digital delivery and broadcast, in the mobile communications terminals;

the digital delivery and broadcast includes sequential delivery of plural data files, each of which includes multiple types of contents files and guidance file for selecting and extracting a contents file to be displayed, from among the contents files;

each of the multiple types of contents files contains the contents information that is output to or displayed on the plurality of mobile communications terminals, and a contents information identifier corresponding to the contents information;

the guidance file contains association information, which is information that associates the contents information identifier included in the multiple types of contents files with an area identifier, the area identifiers each being given correspondingly to each of plural areas divided in the broadcast target area of the digital delivery and broadcast;

in the broadcasting step, same guidance file is delivered multiple times in one delivery period of the multiple types of contents files; and the contents receiving step further comprises:

a contents file specifying step of specifying the contents file, which corresponds to the contents information identifier associated with the area identifier of the broadcast target area that matches an area identifier of a present region including the current position detected by the mobile communications terminals, or matches an area identifier of a mobile plan region including the guidance route to the destination point that was input to the mobile communications terminals;

a contents file extracting step of extracting only the specified contents file from the digital delivery and broadcast; and a contents, in the mobile communications terminals, displaying/outputting step of displaying or outputting the contents information included in the extracted contents file.

4. A mobile communications terminal comprising:

a current position detector that detects a current position;

a destination point input unit configured to input a destination point;

a route guidance unit that displays or outputs a guidance route to the destination point; and a digital broadcast receiver that receives a digital delivery and broadcast;

wherein the digital broadcast receiver specifies multiple types of contents files and guidance file for selecting and extracting, from among the contents files, a contents file to be displayed, from within the digital delivery and broadcast;

each of the multiple types of contents files contains contents information that is output to or displayed on the route guidance unit, and a contents information identifier corresponding to the contents information;

the guidance file contains association information, which is information that associates the contents information identifier included in the multiple types of contents files with an area identifier of, the area identifiers each being given correspondingly to each of plural areas divided in the broadcast target area of the digital delivery and broadcast, and same guidance file is delivered multiple times in one delivery period of the multiple types of contents files; and the route guidance unit is configured to:

specify the contents file, which corresponds to the contents information identifier associated with the area identifier that matches an area identifier of a present region including the current position detected by the current position detector, or matches an area identifier of a mobile plan region including the guidance route to the destination point that was input to the destination point input unit;

extract only the specified contents file from the digital delivery and broadcast through the digital broadcast receiver; and display or output, in the mobile communications terminals, the contents information included in the extracted contents file.

* * * * *